(12) United States Patent
Beij et al.

(10) Patent No.: US 12,022,587 B2
(45) Date of Patent: Jun. 25, 2024

(54) LED LIGHTING SYSTEM AND CONTROL METHOD

(71) Applicant: SIGNIFY HOLDING B.V., Eindhoven (NL)

(72) Inventors: Marcel Beij, Sint Oedenrode (NL); Bertrand Johan Edward Hontele, Breda (NL)

(73) Assignee: SIGNIFY HOLDING B.V., Eindhoven (NL)

(*) Notice: Subject to any disclaimer, the term of this patent is extended or adjusted under 35 U.S.C. 154(b) by 126 days.

(21) Appl. No.: 17/801,390

(22) PCT Filed: Feb. 16, 2021

(86) PCT No.: PCT/EP2021/053748
§ 371 (c)(1),
(2) Date: Aug. 22, 2022

(87) PCT Pub. No.: WO2021/170451
PCT Pub. Date: Sep. 2, 2021

(65) Prior Publication Data
US 2023/0100907 A1 Mar. 30, 2023

(30) Foreign Application Priority Data

Feb. 25, 2020 (EP) .................................... 20159267

(51) Int. Cl.
*H05B 45/44* (2020.01)
*H05B 45/10* (2020.01)
(Continued)

(52) U.S. Cl.
CPC ............. *H05B 45/44* (2020.01); *H05B 45/10* (2020.01); *H05B 45/325* (2020.01); *H05B 45/375* (2020.01); *H05B 45/395* (2020.01)

(58) Field of Classification Search
CPC ...... H05B 45/10; H05B 45/395; H05B 45/37; H05B 45/44; H05B 45/375; H05B 45/48; H05B 45/59; H05B 44/00; H05B 45/14; H05B 45/325; H05B 45/3725; H05B 45/397; H05B 47/23; H05B 47/24;
(Continued)

(56) References Cited

U.S. PATENT DOCUMENTS 9,414,449 B2 * 8/2016 Reed .................... H02M 1/4208
10,230,296 B2 * 3/2019 Reed ...................... H02M 1/14
(Continued)

FOREIGN PATENT DOCUMENTS

JP 2011023113 A 2/2011

*Primary Examiner* — Monica C King

(57) ABSTRACT

A system is created for an efficient dimming LED lighting system, and comprising a voltage source, an electronic switch controlled by a pulse width modulation, PWM, driving signal and an LED lighting module connected in series. The LED comprises an LED group and a constant current drive circuit to drive a constant current through the LED group. The voltage source and a bypass branch, which is connected in parallel with the electronic switch, is adapted such that when the electronic switch is open, a power delivered to the constant current drive circuit is sufficient to maintain operation of the constant current drive circuit, ensuring capability for a deep dimming.

12 Claims, 8 Drawing Sheets

(51) Int. Cl.
  *H05B 45/325* (2020.01)
  *H05B 45/375* (2020.01)
  *H05B 45/395* (2020.01)

(58) Field of Classification Search
  CPC .... H05B 45/34; H05B 45/345; H05B 45/357; H05B 45/56; H05B 47/185; H05B 45/355; H05B 45/3578; H05B 45/38; H05B 45/385; H05B 45/54; H02M 1/14; H02M 1/0074; H02M 3/156; F21Y 2115/10; Y02B 20/30; Y02B 20/40
  See application file for complete search history.

(56) References Cited

U.S. PATENT DOCUMENTS

| | | |
|---|---|---|
| 2008/0297062 A1 | 12/2008 | Otake et al. |
| 2012/0001566 A1* | 1/2012 | Josefowicz ............ H05B 45/12 315/291 |
| 2012/0051757 A1 | 3/2012 | Nishino et al. |
| 2012/0194079 A1 | 8/2012 | Clauberg et al. |
| 2013/0015785 A1 | 1/2013 | Kamada et al. |
| 2014/0334826 A1 | 11/2014 | Kido et al. |
| 2014/0361623 A1 | 12/2014 | Siessegger et al. |
| 2015/0245433 A1 | 8/2015 | McCune, Jr. |
| 2020/0068678 A1* | 2/2020 | Zhang .................... H05B 45/44 |

* cited by examiner

LED LIGHTING SYSTEM AND CONTROL METHOD

CROSS-REFERENCE TO PRIOR APPLICATIONS

This application is the U.S. National Phase application under 35 U.S.C. § 371 of International Application No. PCT/EP2021/053748, filed on Feb. 16, 2021, which claims the benefit of European Patent Application No. 20159267.2, filed on Feb. 25, 2020. These applications are hereby incorporated by reference herein.

FIELD OF THE INVENTION

This invention relates to the field of lighting systems, and more specifically the field of LED lighting systems. It relates particularly, but not exclusively, to LED lighting systems which include dimming functionality based on the interruption of the supply of current to the lighting load.

BACKGROUND OF THE INVENTION

There are many different drive schemes for driving luminaires using LEDs. Complex circuits such as high frequency switch mode power converter circuits are for example used in mains lighting systems, and they can high power factor and low total harmonic distortion, but they are high cost solutions. Lower cost circuits for example use a linear driver. A most basic drive circuit may simply supply a DC voltage to the LED through a so-called ballast resistor, which acts as a current limiter.

A complex driver will incorporate dimming functionality, for example with a dimming input which provides control of the setting of the switch mode power converter. In order to implement dimming in a more simple circuit, the current supply to the LED arrangement may be interrupted, for example using a series switch which is controlled using a pulse width modulation, PWM, signal. The duty cycle of the PWM signal then determines the light output.

For an LED to perform optimally, it is driven by a current as specified by the manufacturer in order to achieve a desired light output at the most efficient operating point. This can most simply be achieved by connecting the LED to a voltage source in series with a resistor as mentioned above. This is a low cost solution, typically used for low and mid power LEDs. The current through the LED is therefore determined by $(V_{VS}-V_{LED})/R$, where $V_{VS}$ is the voltage supplied by the voltage source, $V_{LED}$ is the forward voltage of the LED and R is the resistance of the resistor in series. However, this resistor leads to losses and therefore brings the efficiency of the lighting system down.

To improve this efficiency, the voltage drop across the resistor must be kept as low as possible. One way to do this is to provide a plurality of LEDs in series. Keeping the light output the same for the multiple LEDs compared to the single LED requires a smaller driver current which in turn reduces the resistor loss. However, it also means that if the forward voltage of the LED is different to the expected value, due to manufacturing error or tolerances for example, the light level will be significantly different. A large difference between $V_{VS}$ and $V_{LED}$ is required in order to negate this fluctuation problem, however this leads to large losses.

A constant current circuit regulating the current through the LED can be used to improve the efficiency, avoiding the need for a current limiting resistor, at the cost of slightly more complex circuitry and therefore an increased system cost.

One problem with the use of constant current circuits is that they tend to have an associated boot-up time before they supply the constant current. This means that for a standard PWM dimming scheme as mentioned above, typically operating in the region of 1 kHz or above, there is a lower limit for the duty cycle, and therefore a lower limit for the LED lighting system to be dimmed.

There remains a need for a driver architecture which enables low cost dimming based on interruption of the current supply to the LED arrangement, but which can achieve a wide range of dimming levels.

SUMMARY OF THE INVENTION

The invention is defined by the claims.

According to examples in accordance with an aspect of the invention, there is provided an LED lighting system, comprising:
a voltage source;
an electronic switch in series with the voltage source, controlled by a pulse width modulation, PWM, driving signal;
a bypass branch in parallel with the electronic switch; and
an LED lighting module in series with the voltage source and the electronic switch, the LED lighting module comprising:
a constant current drive circuit; and
an LED group,
wherein the constant current drive circuit is adapted to drive a constant current through the LED group, and
wherein the bypass branch and/or voltage source are adapted such that, when the electronic switch is open, a power delivered to the constant current drive circuit is sufficient to maintain operation of the constant current drive circuit.

This LED lighting system enables the dimming of a single, or group, of LEDs. A PWM signal with a duty cycle selected for the desired amount of dimming is applied to an electronic switch. When the switch is open, the LEDs are intended to be turned off. A bypass branch is in parallel across the switch. The parallel combination of the switch and the bypass branch is connected in series with a voltage source and an LED lighting module. The LED lighting module consists of an LED group and a constant current drive circuit. The constant current drive circuit ensures a constant current through the LED group, which ensures a correct light output as specified by the manufacturer of the LED group. This contrasts to a more basic system of a static resistor in series, which results in a lower efficiency and less consistent light output characteristics. In addition, several LED lighting modules can be connected together in parallel.

The bypass branch enables the constant current drive circuit to remain powered even when the LEDs are turned off. The delivered power is for example used as a supply voltage which is sufficient to maintain the drive circuit operational.

When certain constant current drive circuits are used there exists a switch-on delay of several microseconds. PWM controlled LED systems usually operate at a PWM frequency greater than 1 kHz so the delay becomes significant particularly for low duty cycles of the PWM signal. For example, with 4 kHz PWM signal, a 1% dimming level gives rise to a 2.5 μs pulse, which is comparable with the switch-on delay. Thus, the lowest possible dimming level is limited.

In addition, large switch-on currents can occur when the constant current drive circuit is switched on, which may require an additional delay in order to ensure that these currents are controlled, which can give rise to a delay of an additional several microseconds. These delays push the lowest possible dimming level up. With the addition of a bypass branch the constant current drive circuit can be continuously powered even when the switch is open, negating this issue.

The bypass branch and/or the voltage source for example are adapted such that, when the electronic switch is open, the voltage across each of the LEDs in the LED group remains lower than a respective threshold voltage. Due to the addition of the bypass branch, the LEDs could also still emit light at a very low, but still visible, level. This is particularly problematic when there are several LED light modules in parallel as a higher current is needed to keep all of the constant current drive circuits powered, leading to a higher current through the LED groups. By keeping the voltage across the LEDs below their threshold voltages, there will be no current flowing across the LEDs. Thus, the constant current drive circuit remains switched on but the LEDs are switched off when the electronic switch is open.

The LED group for example comprises one or more LEDs connected in series. This means that the overall threshold voltage for the LED group can be selected such that the threshold voltage is not reached when the electronic switch open. Each additional LED placed in series increases the threshold voltage. A desired lighting level can also be selected based on the number of LEDs in the group.

The bypass branch for example comprises a resistor. The resistor lowers the voltage across the LED group to avoid any current through the LED group when the electronic switch is open, but allows a high enough voltage to ensure operation of the constant current drive circuit.

The bypass branch for example comprises a Zener diode. The Zener diode provides a predetermined voltage drop, and hence lowers the voltage across the LED group to avoid any current through the LED group when the electronic switch is open, but allows a high enough voltage to ensure operation of the constant current drive circuit.

The bypass branch for example comprises a resistor and a Zener diode in series. If a voltage low enough for LED switch off and high enough for operation of the constant current drive circuit is not possible with one of the Zener diode or resistor, a resistor added in series with the Zener diode can be used.

The constant current drive circuit for example is a buck converter. The buck converter may be used to maintain a constant current across the LED group by high speed switching, in known manner. This provides an electrically efficient design but with a relatively high cost circuit.

The constant current drive circuit may instead be a linear constant current converter. The linear constant current converter keeps the current across the LED group constant by operating a drive transistor in its linear regime. This is more efficient than a simple resistor circuit and has a lower system cost than the use of a buck controller.

The electronic switch for example is a transistor.

The system may further comprise a plurality of LED lighting modules, each comprising a respective constant current drive circuit and a respective LED group, each LED lighting module in a respective parallel branch, wherein the bypass branch is adapted such that, when the electronic switch is open, the voltage across each constant current drive circuit remains sufficient to operate the constant current drive circuit. The lighting system may thus have multiple LED branches.

According to examples in accordance with an aspect of the invention, there is provided a method of controlling an LED lighting system, comprising:

controlling an electronic switch using PWM control, thereby to implement dimming, wherein the electronic switch is in series with a voltage source and an LED lighting module;

when the electronic switch is closed, using the voltage source to power a constant current drive circuit of the LED module thereby to drive a constant current through an LED group of the LED lighting module; and when the electronic switch is open, using the voltage source to deliver power to the constant current drive circuit through a bypass branch in parallel with the electronic switch, wherein said delivered power is sufficient to maintain operation the constant current drive circuit.

In an example, when electronic switch is open, the voltage across each of the LEDs in the LED group remains lower than a respective threshold voltage.

The bypass branch for example comprises a resistor, a Zener diode or a resistor and a Zener diode in series.

Powering a constant current drive circuit for example comprises operating a buck converter or a linear constant current converter.

In an example, when the electronic switch is closed, the method comprises powering a constant current drive circuit of a plurality of LED lighting modules, each comprising a respective constant current drive circuit and a respective LED group, each LED lighting module being in a respective parallel branch, wherein when the electronic switch is open, the voltage across each constant current drive circuit remains sufficient to operate the constant current drive circuit.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1A:
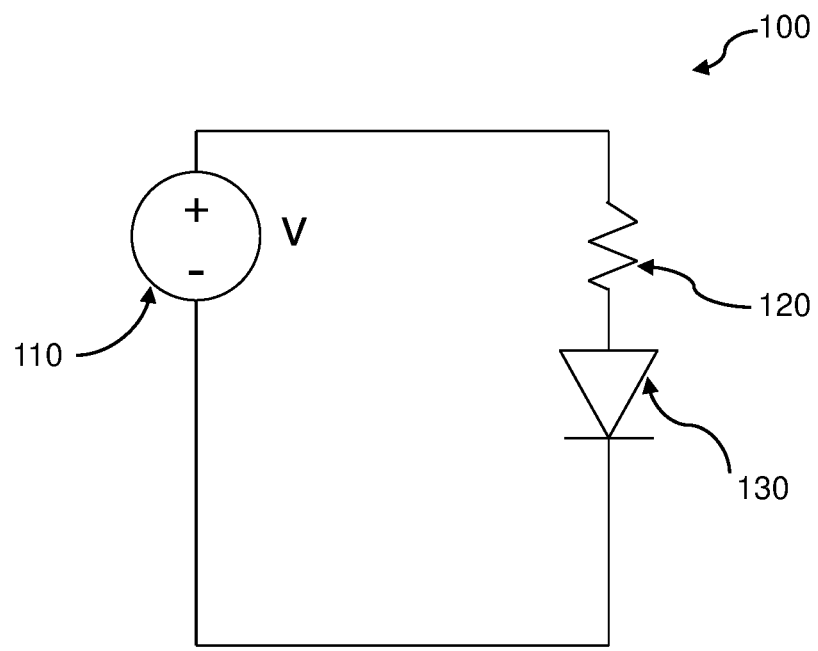
FIG. 1A shows a basic LED lighting system, with one LED, a voltage source and a resistor in series.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides an LED lighting system, comprising a voltage source, an electronic switch controlled by a pulse width modulation (PWM) driving signal and an LED lighting module all of which connected in series. The LED lighting module comprises an LED group and a constant current drive circuit which is adapted to drive a constant current through the LED group. In addition, the LED lighting system further comprises a bypass branch in parallel with the electronic switch. This bypass branch and/or voltage source are adapted such that, when the electronic switch is open, a power delivered to the constant current drive circuit is sufficient to maintain operation of the constant current drive circuit.

Figure 1B:
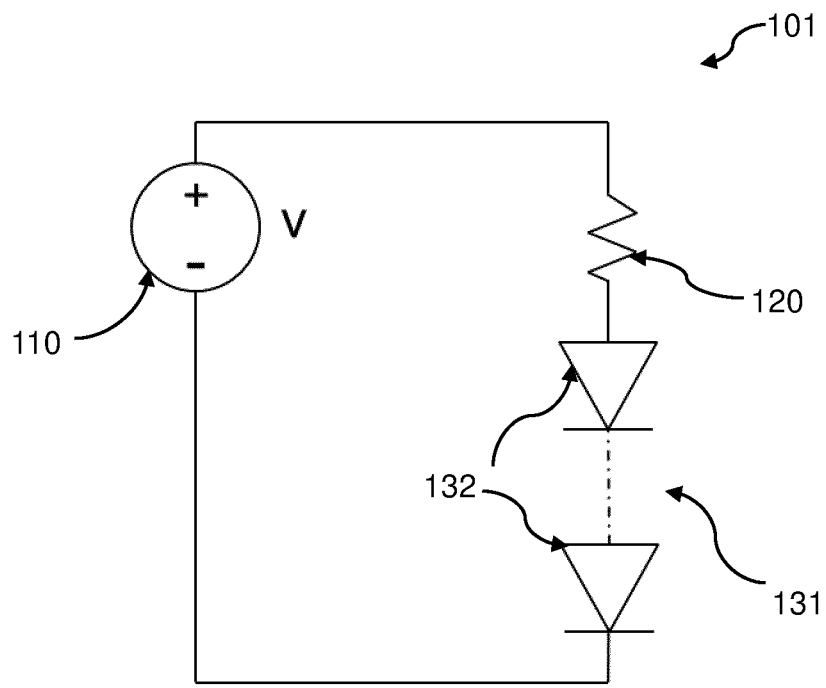
FIG. 1B shows a basic LED lighting system, with an LED group and a resistor in series.

FIGS. 1A and 1B show examples of an LED lighting circuit 100, 101. The circuit of FIG. 1A comprises a voltage source 110, a resistor 120 and an LED 130 in series. FIG. 1B shows the LED lighting circuit 100 of FIG. 1A, but with an LED group 131 instead of a single LED 130. The LED group 131 comprises a plurality of LEDs 132 connected in series.

The current level required for an LED to output a required light level is specified by the manufacturer, but must also be limited in order to avoid damaging the LED. This driving current is provided in both examples by connecting the voltage source and resistor in series.

The driving current through the LED is determined by: $(V_{VS}-V_{LED})/R$, where $V_{VS}$ is the voltage supplied by the voltage source, $V_{LED}$ is the forward voltage of the LED and R is the resistance of the resistor in series. The voltage drop across the LED, the forward voltage, is relatively constant over the range of driving currents.

Therefore, with a forward voltage and driving current specified by the manufacturer of the LED, alongside a voltage source, a resistor value can be determined. However, this resistor leads to losses and thus brings the efficiency of the system down.

For example, if the LED 130 in FIG. 1A has a forward voltage of 3V at 200 mA, and the voltage source 110 supplies 10V, the resistor 120 will need to be a 35Ω resistor in order to supply the 200 mA. This leads to a 1.4 W resistor loss. If the LED group 131 in FIG. 1B comprises 3 LEDs and a voltage source 110 identical to the example of FIG. 1A, in order to achieve the same light level as in the example above, a current of 66.6 mA and a forward voltage of 9V through the LED group 131 is required. In this case, the value of the resistor 121 will need to be 150. This leads to a 0.066 W resistor loss, a factor of approximately 21 times lower than that of the example of FIG. 1A.

This improvement in efficiency is due to a lower voltage drop across the resistor. Unfortunately, the forward voltage of the LED is a production factor, meaning that this value can vary by several percent.

If, in the example given for FIG. 1A, the LED forward voltage due to tolerances is 10% higher, the forward voltage required by the LED 130 will be 3.3V. For the resistance value of 350, this would mean the current through the LED 130 decreases by 5% to 191 mA, resulting in a light output which is 5% lower.

If, in the example given for FIG. 1B, the LED forward voltage due to tolerances is 10% higher, the forward voltage required by the LED group 131 will be 9.9V. For the resistance value of 150, this would mean the current through the LED group 131 decreases by 90% to 6.66 mA, resulting in a light output which is 90% lower.

To summarize, given a lower voltage drop across the resistor 120, a lower resistor loss is achieved, increasing the efficiency of the lighting system. However, this makes the light output of the system more susceptible to change due to a variation in the forward voltage of the LED group 131. This is due to a smaller headroom between the voltage supplied by the voltage source 110 and the forward voltage of the LED group 131, which means a small variation in forward voltage results in a larger variation in driving current.

Figure 2A:
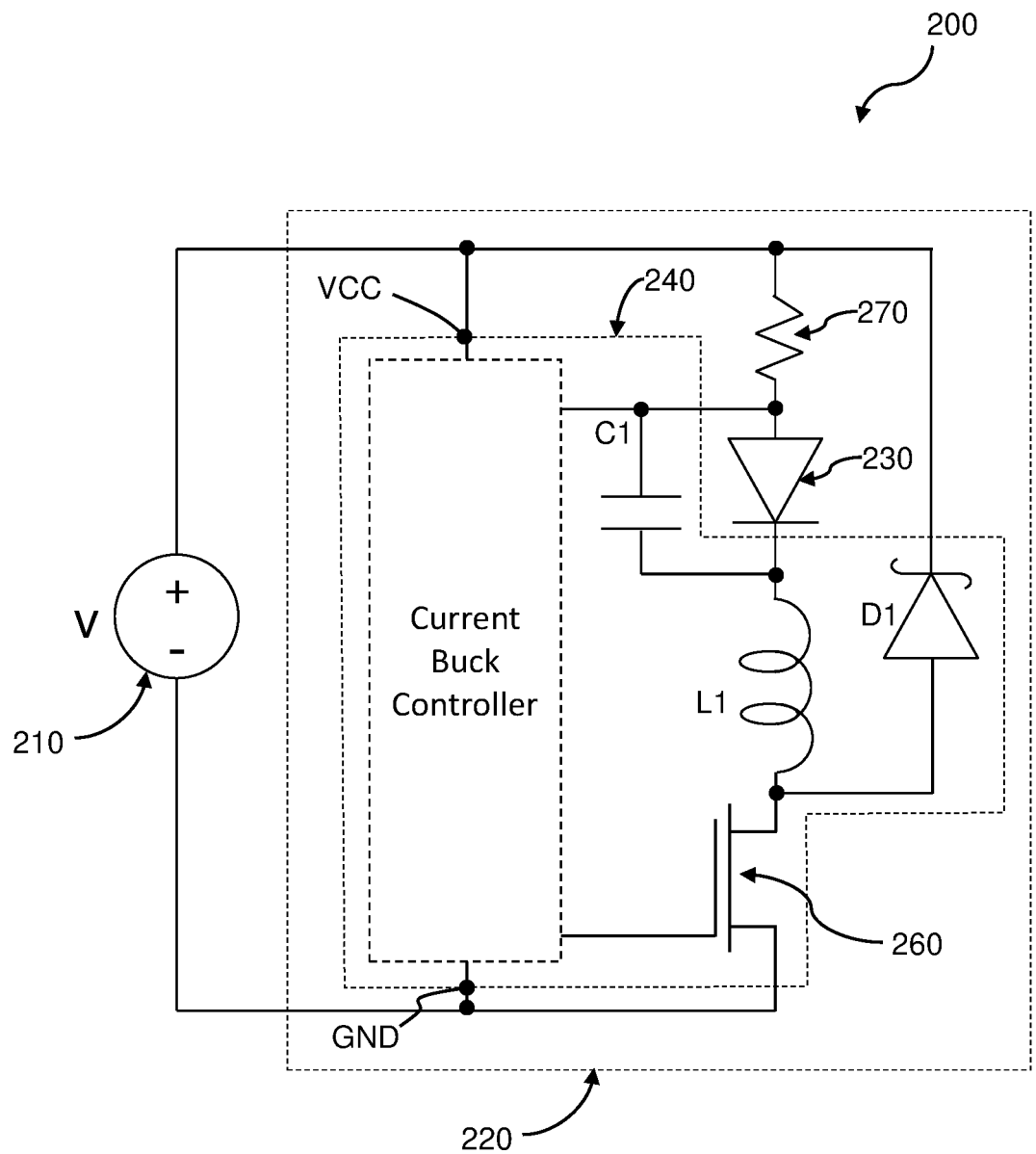
FIG. 2A shows an LED lighting system with a buck controller providing constant current through an LED group.

FIG. 2A shows an example of a LED lighting circuit 200 comprising a voltage source 210 and an LED lighting module 220. The LED lighting module 220 comprises a constant current drive circuit 240 and an LED group 230. The constant current drive circuit 240 is adapted to control the current through the LED groups 230.

The constant current drive circuit 240 is a current buck controller circuit. It is operated by supply rails comprising a supply voltage VCC and a ground voltage GND. These supply rails are derived from the output of the voltage source 210. The constant current drive circuit for example has a minimum supply voltage (relative to ground) at which the circuit remains operational.

The constant current through the LED group 230 is achieved by the buck controller at a high switching speed, in a known manner. The current is sensed by a current sense resistor 270. The current buck controller 240 controls a series main converter switch 260 in response to the monitored current across the sense resistor 270. The capacitor C1 and inductor L1 form a tank circuit of the buck converter and the diode D1 is the freewheeling diode of the buck converter. This provides an efficient design and a consistent light output from the LED group 230. However, this solution requires the use of inductors and a high speed buck controller, giving a system cost increase.

Figure 2B:
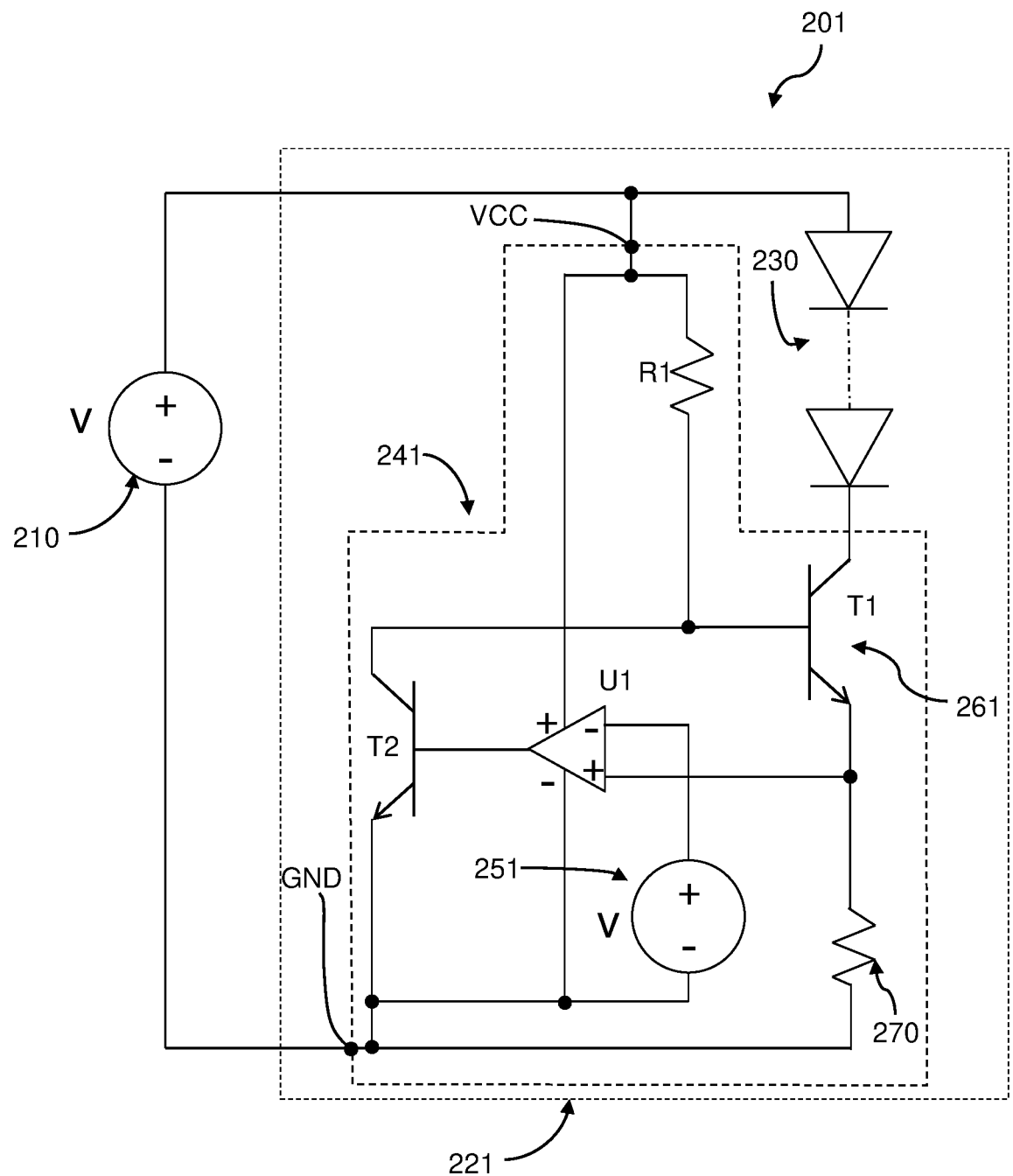
FIG. 2B shows an LED lighting system with a linear constant current converter providing constant current through an LED group.

FIG. 2B shows an alternative example of an LED lighting circuit 201, again comprising a voltage source 210 and an LED lighting module 221. The LED lighting module 221 comprises a constant current drive circuit 241 and an LED group 230. The constant current drive circuit 241 in this example is a linear constant current converter.

The constant current converter comprises a main transistor 261 (T1) which is operated in the linear regime. A current sense resistor 270 again senses the current flowing through the LED group 230. The resulting voltage is compared to a reference, represented by voltage source 251, at a comparator U1. The output of the comparator determines the conduction state, and hence output impedance, of a transistor T2. The transistor T2 forms a potential divider with resistor R1 such that the voltage at the junction between the transistor T2 and the resistor R1 varies in dependence on the current flowing through the LED group. This in turn controls the base voltage of the main transistor T1. In this way, a feedback path is formed which regulates the conduction state of T1 to maintain a desired current, set by the reference 251. If the current drops, T2 is driven to a lower impedance state and hence the voltage on the base of T1 increases, to provide regulation (increase in this case) of the current.

The constant current drive circuit 241 is operated by supply rails comprising a supply voltage VCC and a ground voltage GND. These supply rails are derived from the output of the voltage source 210. The constant current drive circuit may be an integrated circuit (with peripheral circuit components), and the integrated circuit again has a minimum supply voltage (relative to ground) at which the circuit remains operational.

This provides an efficient design and a consistent light output from the LED group 230. The linear constant current converter has a lower system cost than the buck controller and is a simpler design.

In FIGS. 2A and 2B, unlike in the lighting circuits shown in FIGS. 1A and 1B, the current through the LED group 230 will remain constant, even if there is a difference between the actual LED group forward voltage and the expected value supplied by the manufacturer.

Figure 3:
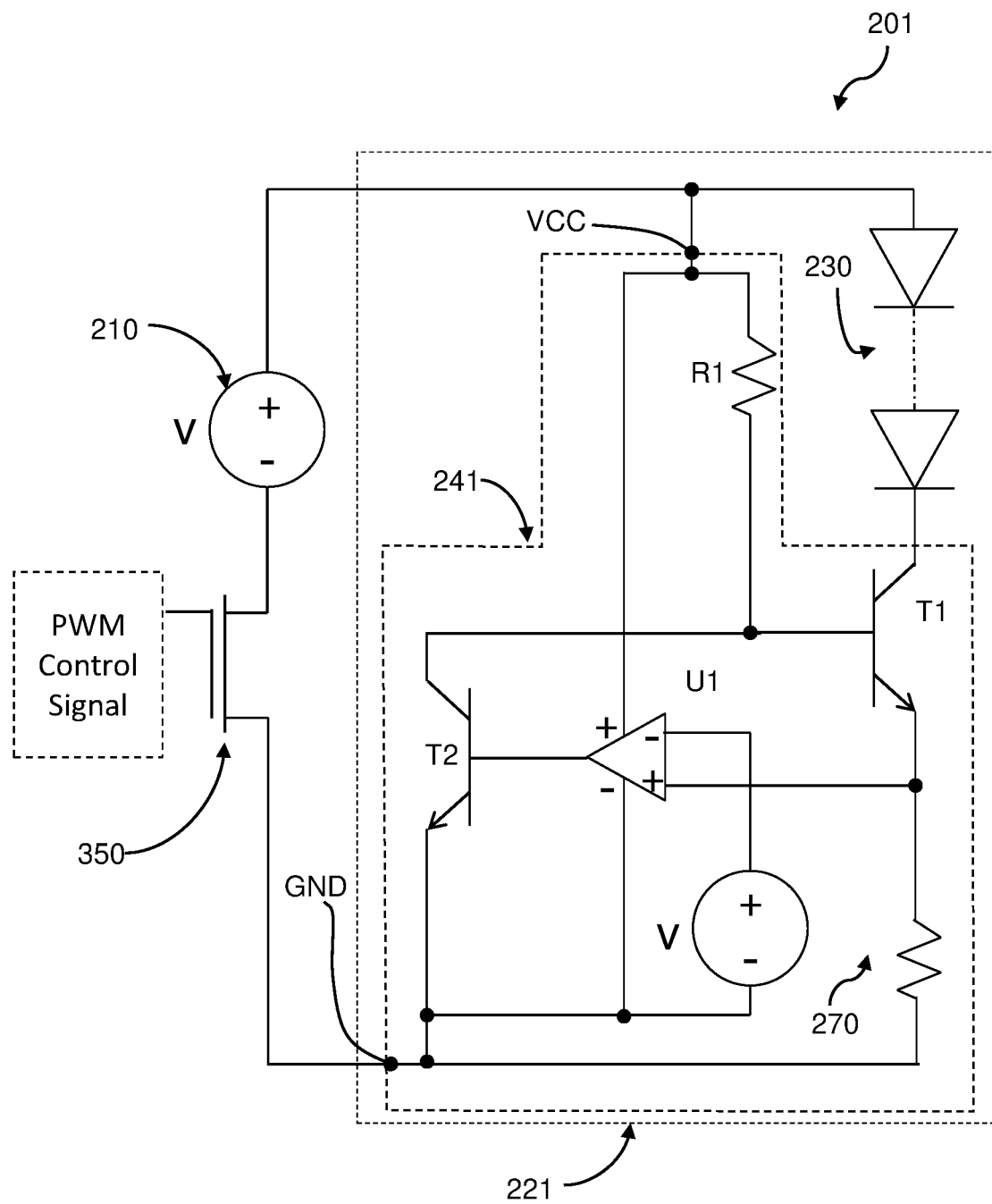
FIG. 3 shows the LED lighting system of FIG. 2B, with a PWM driven electronic switch in series with the voltage source and LED lighting module for dimming.

FIG. 3 shows an example of an LED lighting circuit 201 comprising a pulse width modulation, PWM, controlled electronic switch 350 connected in series with the voltage source 210 and an LED lighting module 320, applied to the circuit design of FIG. 2B.

The electronic switch 350 may be, for example, a transistor, or another switch known by a person skilled in the art, which can be switched on and off by an electronic signal.

The PWM controlled electronic switch 350 enables the dimming of the light output of the LED group 230. This is performed by repeatedly and regularly opening and closing the electronic switch 350, connecting and disconnecting the voltage source 210 to the LED lighting module 221. By decreasing the duty cycle, the average light output from the LED group 230 is reduced, with this effect perceived as dimming by the human eye. By increasing the duty cycle, the average light output from the LED group 230 is increased up to a maximum level where the LED group 230 is constantly switched on. Accordingly, the duty cycle can be selected for the desired level of dimming.

This method of dimming becomes an issue if the constant current drive circuit is a current buck converter, a linear constant current converter, or any other constant current system that requires time to boot up. In the case of the linear constant current converter 241 shown in FIG. 3, the boot-up time, or the time which it takes for the electronics to start functioning, is usually several microseconds. During this boot-up time, large switch on currents can lead to damage of the LED group 230 so that additional measures are taken to limit the current, introducing further delays.

PWM controlled LED systems usually operate at a PWM control frequency of above 1 kHz. Thus, the period is less than 1 ms. Given a PWM control frequency of 1 kHz, at 0.1% dimming the LED lighting module 230 is only connected for 1 microsecond during an on/off cycle. Due to the issues with high switch-on currents during boot-up of the electronics, the connection of the constant current drive circuit may have to be delayed. If this delay time is only 2 microseconds, the minimum dimming level of the LED lighting system will be at least 0.2%. If the PWM control frequency is increased to 5 kHz, then this minimum dimming level increases to 1%. Thus, when a boot-up time is present, there exists a lower limit to the dimming level.

Therefore, to overcome this minimum dimming level, the boot-up time needs to be avoided. In order to achieve this, the invention is based on implementations in which the constant current drive circuit is continuously powered. However, this is not simple to achieve in a system with series interrupt switch 350 (i.e. a single-wired system), in that the switch 350 will remove power from the LED lighting module and hence from the constant current driver circuit.

Figure 4A:
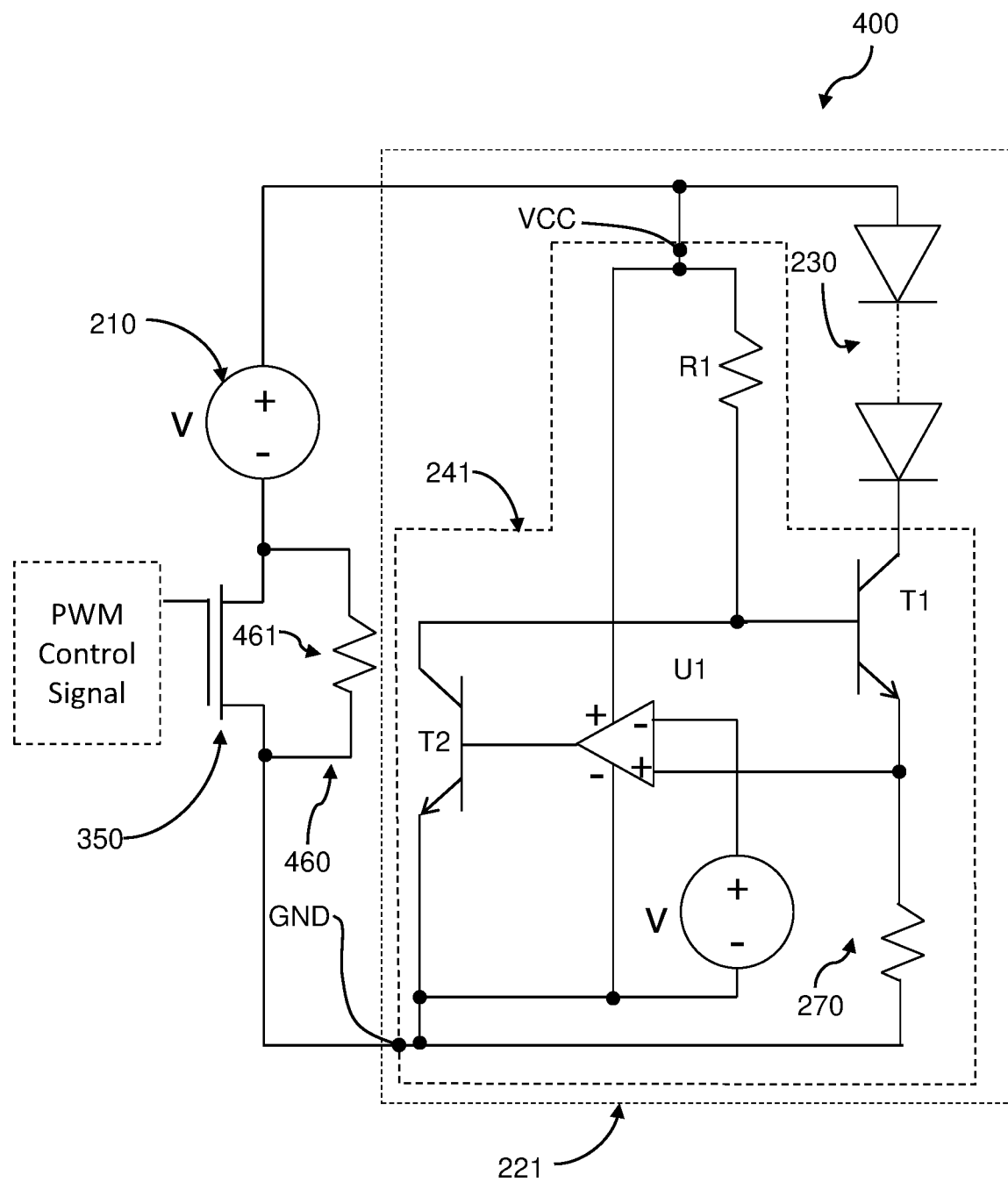
FIG. 4A shows an LED lighting system of FIG. 3, with a first bypass branch comprising a resistor, in parallel with the electronic circuit.
Figure 4B:
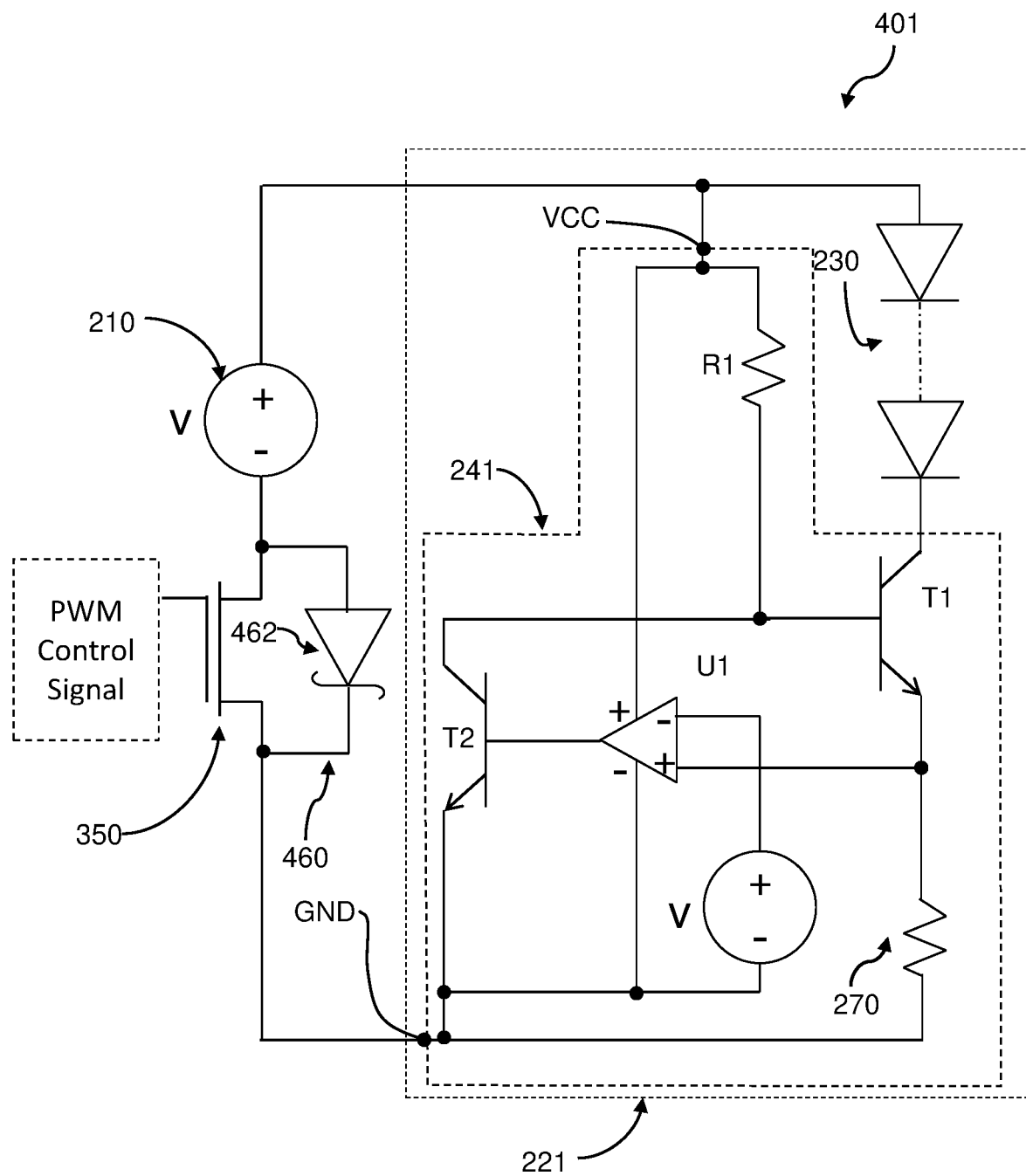
FIG. 4B shows an LED lighting system of FIG. 3, with a second bypass branch comprising a Zener diode, in parallel with the electronic circuit.
Figure 4C:
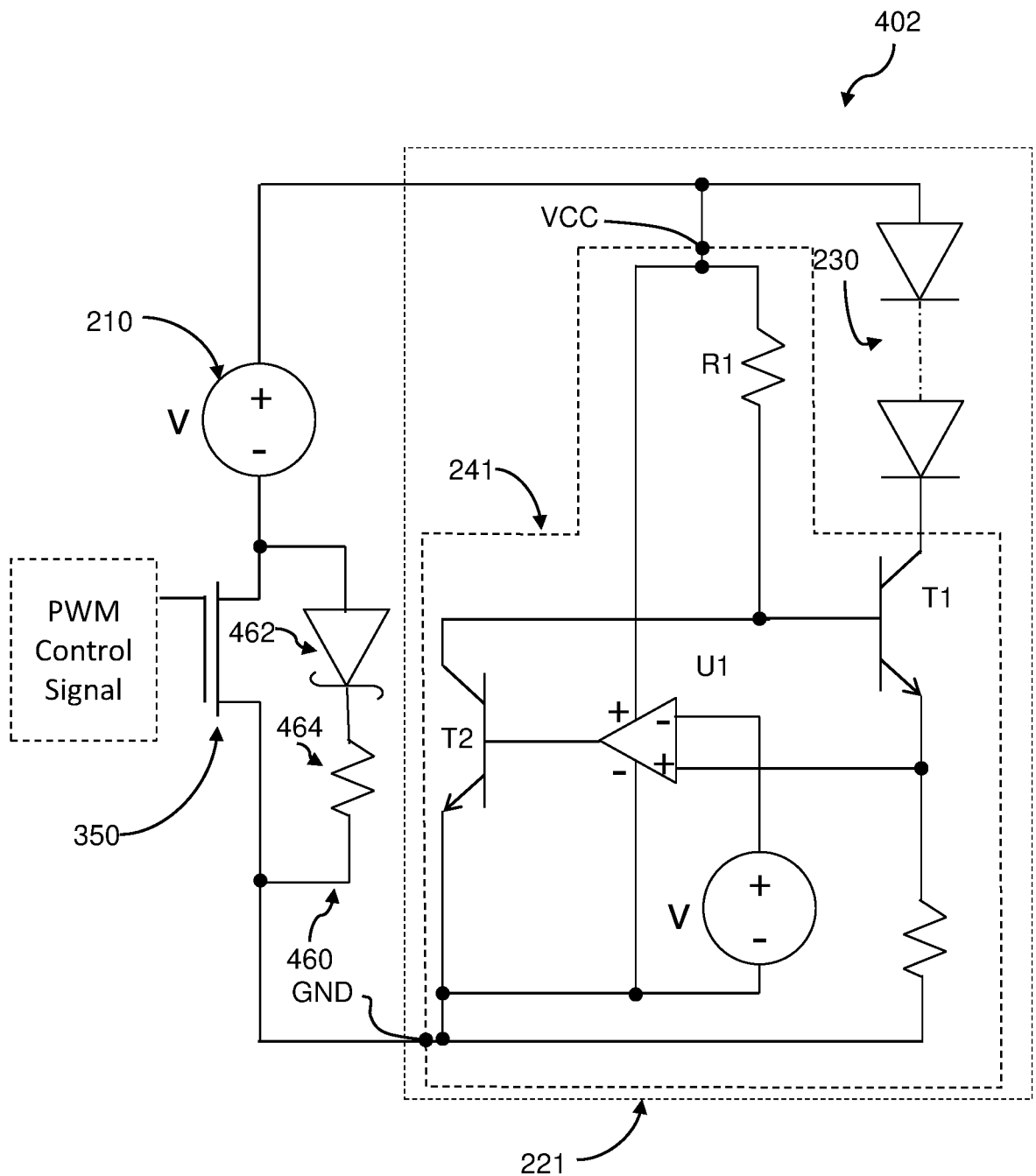
FIG. 4C shows an LED lighting system of FIG. 3, with a first bypass branch comprising a resistor and Zener diode connected in series, in parallel with the electronic circuit.

FIGS. 4A, 4B and 4C show examples of an LED lighting system in accordance with the invention, and based on a modification to the circuit of FIG. 3.

FIG. 4A shows a lighting system 400 comprising an electronic switch 350 driven by a PWM signal, a voltage source 210 and an LED lighting module 221 in series, as described above.

The LED lighting system 400 further comprises a bypass branch 460 connected in parallel with the electronic switch 350.

The bypass branch 460 comprises a resistor 461 in this first example.

The addition of the resistor 461 in parallel with the electronic switch 350 provides a path by which current can flow when the electronic switch 350 is open. This enables the power supply to the linear constant current converter 241 to be maintained, in particular the power supply VCC to the comparator U1 and the other circuit components. The linear constant current converter 241 will therefore be able to continuously operate even when the electronic switch 350 is open. This means that there is no longer a lower limit to the dimming level as there is no need for the linear constant current converter 241 to boot-up.

The LED group 230 will preferably be turned off, by ensuring that the voltage drop across the resistor 461 results in the voltage across the LED group being below the combined threshold voltages of the LEDs. However, the voltage supply VCC to the linear constant current converter 241 remains higher than its minimum operating voltage (discussed above), enabling the linear constant current converter to operate. There is thus a range of voltages between the minimum operating voltage of the constant current drive circuit and the forward voltage of the LED group, and by delivering a drive voltage in this range, the LED group can be turned off while the constant current drive circuit remains active.

The minimum supply voltage VCC is for example 2.5V so the LED string operating voltage must be above this. The resistor has a value such that the linear constant current converter is operating while the current through the LEDs is as low as possible.

The transistor T2 will be driven to off (or to the lowest conduction state corresponding to the lowest output voltage from the comparator U1) during this time, because no current flows through the current sense resistor 270. Thus results in pulling up of the base voltage of T1. Thus, while the switch 350 is open and the circuit is powered by the by-pass path while the LEDs are off, the sense resistor current is null and therefor the current transistor T1 controlled by the switch will be maximally open.

When the switch 350 is closed, the transistor T1 will again conduct current and this current will be regulated by the constant current drive circuit.

Thus, even if there is a very low duty cycle, the circuit is ready to deliver current to the LED group; the circuits are already powered and the transistor is in a suitable conduction state to deliver current as soon as the forward voltage of the LED group is reached.

There is a response time for the circuit to bring the current transistor back to the correct value depending on the sense resistor, with a risk off a "flash" current. This issue depends on the time and so the speed of the control loop of the circuit. Any such flash should not be allowed to be visible and even more importantly the LEDs must be able to handle any current spike that may arise without damage.

The gain of the transistor T1 can be limited so that the maximum current will not become too high.

FIG. 4B shows as second example of lighting system 401 which is identical to FIG. 4A apart from the bypass branch, which in this example comprises a Zener diode 462. This provides a step voltage drop (independent of current). The Zener diode 462 again provides a path by which current can flow when the electronic switch 350 is open. The Zener diode 462 is adapted such that it lowers the voltage across the LED group 230 to a voltage lower than the forward voltage of the LED group 230, preventing current across the LED group 230, and thereby the emission of light.

As explained above, the voltage supply to the linear constant current converter 241 remains higher than its minimum operating voltage, enabling the linear constant current converter to operate.

FIG. 4C shows a third example of lighting system 402 which is identical to FIG. 4A apart from the bypass branch, which comprises a Zener diode 462 and a resistor 464 in series. The resistor 464 may additionally prevent an undesirably high current through the LED lighting module 221 when the switch is open.

In FIGS. 4A to 4C, the number of LEDs connected in series in the LED group 230 can be selected in order to achieve a desired overall forward voltage for the LED group 230. The forward voltage for the LED group will be the result of the sum of all of the forward voltages of LEDs in the LED group. This allows the minimum operating voltage of the constant current drive circuit to be set at a suitable level lower than the combined threshold voltages of the LEDs.

Figure 5:
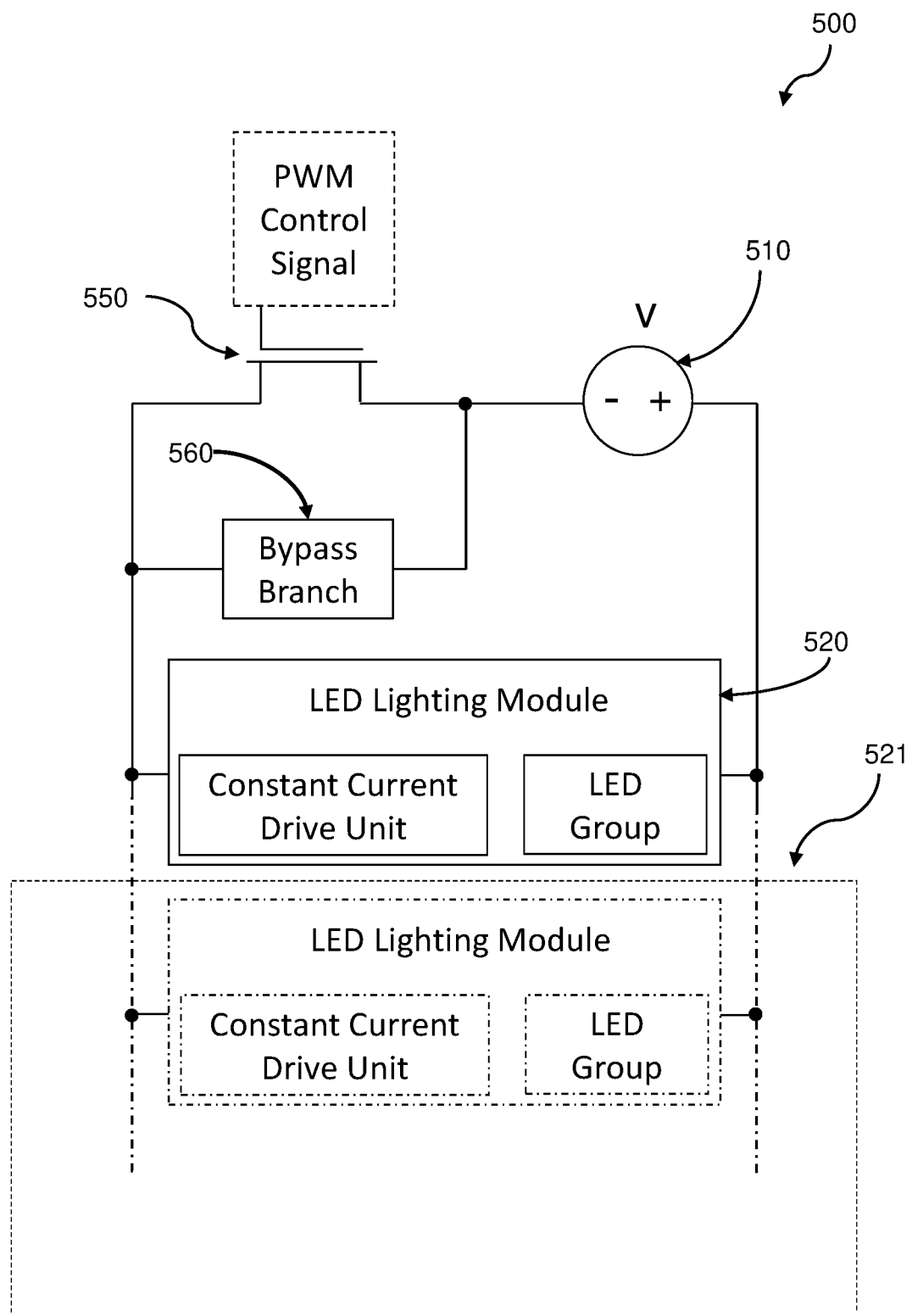
FIG. 5 shows an LED dimming lighting system, with multiple LED lighting modules connected in parallel.

FIG. 5 shows an example of an LED lighting system 500 comprising a PWM controlled electronic switch 550, a voltage source 510 and an LED lighting module 520 in series. There is a bypass branch 560 in parallel with the PWM controlled electronic switch 550. There is further a plurality of optional LED lighting modules 521 in parallel to each other.

The plurality of LED lighting modules 520, 521 allows a plurality of LED groups to be added to the LED lighting system, with the option of a plurality of threshold voltages and driving currents. The bypass branch 560 is adapted to the plurality of LED lighting modules accordingly, in order to ensure that the voltage across the plurality of constant current drive circuits remains sufficiently high for continued operation when the electronic switch 550 is open. The bypass branch 560 is also adapted to ensure that the voltage across the plurality of LED groups 530 remains lower than the forward voltages of the LED groups 530, thereby preventing emission of light when the electronic switch 550 is open.

The invention has been described with reference to a linear constant current driver. This gives a low cost solution. However, the same approach may be applied to a buck converter. Any other constant current converter may be used. Essentially, the current driver is a current source circuit, and any suitable current source circuit may be used.

The invention is for example of interest for LED systems such as LED strips, which are driven using a DC voltage. The DC voltage may for example be obtained by rectification from the mains.

The system for example operates at a voltage within the range 2V to 50V. The maximum voltage depends on the IC process and is for example in the range 18V to 50V. By way of example, an IC operating range may be 2.5V to 18V.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. An LED lighting system, comprising:
   a voltage source;
   an electronic switch in series with the voltage source, controlled by a pulse width modulation, PWM, driving signal;
   a bypass branch in parallel with the electronic switch; and
   an LED lighting module in series with the voltage source and the electronic switch, the LED lighting module comprising:
     a constant current drive circuit adapted to receive a power via a power supply having a return coupled between the electronic switch and the LED lighting module; and
     an LED group comprising a plurality of LEDs connected in series,
   wherein the constant current drive circuit is adapted to drive a constant current through the LED group, and
   wherein the bypass branch is adapted such that, when the electronic switch is open, the power delivered to the constant current drive circuit powered is sufficient to maintain operation of the constant current drive circuit,
   wherein the bypass branch is adapted so that a voltage drop across the bypass branch results in a voltage across the LED group being below a combined threshold voltage of the LEDs.

2. The LED lighting system of claim 1, wherein the bypass branch comprises a resistor.

3. The LED lighting system of claim 1, wherein the bypass branch comprises a Zener diode.

4. The LED lighting system of claim 1, wherein the bypass branch comprises a resistor and a Zener diode in series.

5. The LED lighting system of claim 1, wherein the constant current drive circuit is a buck converter.

6. The LED lighting system of claim 1, wherein the constant current drive circuit is a linear constant current converter.

7. The LED lighting system of claim 1, wherein the electronic switch is a transistor.

8. The LED lighting system of claim 1, comprising a plurality of LED lighting modules, each comprising a respective constant current drive circuit and a respective LED group, each LED lighting module in a respective parallel branch, wherein the bypass branch is adapted such that, when the electronic switch is open, the voltage across each constant current drive circuit remains sufficient to operate the constant current drive circuit.

9. A method of controlling an LED lighting system, comprising:

controlling an electronic switch using PWM control, thereby to implement dimming, wherein the electronic switch is in series with a voltage source and an LED lighting module;

when the electronic switch is closed, using the voltage source to power a constant current drive circuit of the LED lighting module thereby to drive a constant current through an LED group, comprising a plurality of LEDs connected in series, of the LED lighting module; and when the electronic switch is open, using the voltage source to deliver power to the constant current drive circuit through a bypass branch in parallel with the electronic switch, wherein said delivered power is sufficient to the constant current drive circuit powered, wherein the bypass branch is adapted so that a voltage drop across the bypass branch results in a voltage across the LED group being below a combined threshold voltage of the LEDs.

10. The method of claim 9, wherein the bypass branch comprises a resistor, a Zener diode or a resistor and a Zener diode in series.

11. The method of claim 9, wherein powering a constant current drive circuit comprises operating a buck converter or a linear constant current converter.

12. The method of claim 9, comprising, when the electronic switch is closed, powering a constant current drive circuit of a plurality of LED lighting modules, each comprising a respective constant current drive circuit and a respective LED group, each LED lighting module being in a respective parallel branch, wherein when the electronic switch is open, the voltage across each constant current drive circuit remains sufficient to operate the constant current drive circuit.

* * * * *